United States Patent
Jung et al.

(10) Patent No.: US 9,884,268 B2
(45) Date of Patent: Feb. 6, 2018

(54) POROUS MATERIAL AND DEVICES FOR PERFORMING SEPARATIONS, FILTRATIONS, AND CATALYSIS AND EK PUMPS, AND METHODS OF MAKING AND USING THE SAME

(75) Inventors: Moon Chul Jung, Arlington, MA (US); Hua Yang, Franklin, MA (US); Edouard S. P. Bouvier, Stow, MA (US)

(73) Assignee: WATERS TECHNOLOGIES CORPORATION, Milford, MA (US)

(*) Notice: Subject to any disclaimer, the term of this patent is extended or adjusted under 35 U.S.C. 154(b) by 961 days.

(21) Appl. No.: 14/124,308

(22) PCT Filed: Jun. 8, 2012

(86) PCT No.: PCT/US2012/041448
§ 371 (c)(1),
(2), (4) Date: Mar. 26, 2014

(87) PCT Pub. No.: WO2012/170755
PCT Pub. Date: Dec. 13, 2012

(65) Prior Publication Data
US 2014/0220278 A1    Aug. 7, 2014

Related U.S. Application Data

(60) Provisional application No. 61/495,062, filed on Jun. 9, 2011.

(51) Int. Cl.
*B01D 15/22*    (2006.01)
*B01J 20/28*    (2006.01)
(Continued)

(52) U.S. Cl.
CPC ............ *B01D 15/22* (2013.01); *B01D 15/08* (2013.01); *B01D 15/10* (2013.01); *B01D 15/18* (2013.01);
(Continued)

(58) Field of Classification Search
CPC ........ B01D 15/08; B01D 15/10; B01D 15/18; B01D 15/22; B01D 15/34; B01J 20/28;
(Continued)

(56) References Cited

U.S. PATENT DOCUMENTS

2003/0191269 A1    10/2003    Ko et al.
2006/0144770 A1    7/2006    Granger et al.
(Continued)

FOREIGN PATENT DOCUMENTS

WO    2005079427    9/2005
WO    2010135660    11/2010
(Continued)

OTHER PUBLICATIONS

Wu et al; Recent development of monolithic stationary phases with emphasis on microscale chromatographic separation Journal of Chromatography A, 1184 (2008) 369-392 entire document.
(Continued)

*Primary Examiner* — Walter B Aughenbaugh
(74) *Attorney, Agent, or Firm* — Schmeiser, Olsen & Watts LLP

(57) ABSTRACT

Embodiments of the present invention are directed to a porous monolith polymeric composition having utility in catalysis, chromatography, filtration, and electro-kinetic pumps, devices incorporating such composition and methods of making and using such monoliths. In some embodiments the monoliths can include a skeletal core having a substantially homogeneous polymeric composition of two or more organic silane monomers and pores that define an
(Continued)

interstitial volume in the skeletal core. The pores can include macropores and less than 5% of the interstitial volume can be mesopores. Such monoliths can, in some embodiments, be disposed in a housing having at least one wall that defines a chamber such that all fluid flowing into the chamber passes through the pores of the monolith.

26 Claims, 4 Drawing Sheets

(51) Int. Cl.
| | |
|---|---|
| B32B 5/02 | (2006.01) |
| B01D 15/10 | (2006.01) |
| B01D 15/08 | (2006.01) |
| B01D 15/18 | (2006.01) |
| B01D 15/34 | (2006.01) |
| B01J 20/26 | (2006.01) |
| B01J 20/285 | (2006.01) |
| B01J 20/32 | (2006.01) |
| B01D 15/38 | (2006.01) |
| B01J 35/10 | (2006.01) |
| B32B 1/02 | (2006.01) |
| B32B 3/26 | (2006.01) |

(52) U.S. Cl.
CPC ......... *B01D 15/34* (2013.01); *B01D 15/3804* (2013.01); *B01J 20/262* (2013.01); *B01J 20/264* (2013.01); *B01J 20/28* (2013.01); *B01J 20/285* (2013.01); *B01J 20/28007* (2013.01); *B01J 20/28014* (2013.01); *B01J 20/28042* (2013.01); *B01J 20/28088* (2013.01); *B01J 20/3212* (2013.01); *B01J 20/3268* (2013.01); *B01J 35/108* (2013.01); *B32B 1/02* (2013.01); *B32B 3/26* (2013.01); *B32B 5/02* (2013.01); *B01J 2220/82* (2013.01); *B01J 2220/86* (2013.01); *Y10T 428/1321* (2015.01); *Y10T 428/1352* (2015.01); *Y10T 428/1376* (2015.01); *Y10T 428/249978* (2015.04)

(58) Field of Classification Search
CPC ............ B01J 20/28007; B01J 20/28014; B01J 20/28042; B01J 20/283; B01J 20/285; B32B 5/02; Y10T 428/1321; Y10T 428/1352; Y10T 428/1376
See application file for complete search history.

(56) References Cited

U.S. PATENT DOCUMENTS

| | | | |
|---|---|---|---|
| 2007/0065356 A1* | 3/2007 | Cabrera | B01J 20/28014 423/338 |
| 2010/0038298 A1 | 2/2010 | Angelini et al. | |
| 2010/0168457 A1 | 7/2010 | Jung et al. | |

FOREIGN PATENT DOCUMENTS

| | | |
|---|---|---|
| WO | 12170755 | 12/2012 |
| WO | 03014450 | 2/2013 |

OTHER PUBLICATIONS

Pierre et al.; Covalent Enzyme Immobilizaiton onto Photopolymerized Highly Porous Monoliths Adv. Mater. 2006, 18, 1822-1826 entire document.
Fields, Silica Xerogel as a Continuous Column Support for High-Performance Liquid Chromatography Anal. Chem. 1996, 68, 2709-2712 entire document.
Motokawa et al.; Monolithic silica columns with various skeleton sizes and through-pore sizes for capillary liquid chromatography, Journal of Chromatography A, 961 (2002) 53-63.
Huang et al.; Surface-Initiated Radical Polymerization on Porous Silica, Anal. Chem. 1997, 69, 4577-4580.
Corriu et al.; New Mixed Organic-Inorganic Polymers: Hydrolysis and Polycondensation of Bis (trirnethoxysilyl) organometallic Precursors; Chem. Mater. 1992, 4, 1217-1224.
Chankvetadze et al.; High-performance liquid chromatographic enantioseparations on capillary columns containing monolithic silica modified with amylose tris (3,5-dimethylphenylcarbamate), J. Chromatography A. 1110 (2006) 46-52.
Roussel et al.; Silica Xerogel as a Continuous Column Support or High-Perfromance Liquid Chromatography, Anal. Chem 1996, 68, 2709-2712.
PCT International Search Report for Application No. PCTUS2012/041448, dated Oct. 4, 2012, 4 pages.
PCT International Written Opinion Report for Application No. PCTUS2012/041448, dated Oct. 4, 2012, 9 pages.
Minakuchi et al.; Octadecylsilated Porous Silica Rods as Separation Media for Reversed-Phase Liquid Chromatography, Anal. Chem 1996, 66, 3498-3501.
Invitation to Pay Additional Fees for Application No. PCT/US2012/041448, dated Jul. 27, 2012 (2 pages).

\* cited by examiner

POROUS MATERIAL AND DEVICES FOR PERFORMING SEPARATIONS, FILTRATIONS, AND CATALYSIS AND EK PUMPS, AND METHODS OF MAKING AND USING THE SAME

CROSS REFERENCE TO RELATED APPLICATIONS

This application is the National Stage of International Application No. PCT/US2012/041448, filed on Jun. 8, 2012, which claims priority to and benefit of U.S. Provisional application No. 61/495,062, filed Jun. 9, 2011. The contents and teachings of each of these applications are hereby expressly incorporated herein by reference in their entirety.

STATEMENT REGARDING FEDERAL FUNDING

Embodiments of the present invention were not made with Federal funding or support.

FIELD OF THE INVENTION

This invention relates in general to porous polymeric materials for use in separations, filtrations, catalysis, electrokinetic (EK) pumps, and methods of making and using the same. Embodiments of the present invention have particular applications for use in chromatographic separations.

BACKGROUND OF THE INVENTION

Chromatography is a separation technique used to separate compositions from each other based on the affinity of each compound, in a mixture of compounds held in a solution, for or to a media through which the composition is moving in relation to. The media is normally held stationary and is sometimes referred to as the stationary phase. The media is normally a bed of particles or beads or a porous monolith. The solution moving through the media is often referred to as the mobile phase. The mobile phase can be a gas or a liquid or a gas held at a critical pressure and temperature, or near critical or super critical pressures and temperatures. As used herein, the term "fluid" refers to all gases and liquids, and critical, near critical and supercritical fluids.

High performance liquid chromatography (HPLC) is performed in closed systems under pressure as is gas and critical, near critical and supercritical chromatographic techniques. These techniques have broad applications; for example, which certainly is not intended to be an exhaustive list, these techniques are used for drug discovery, chemical analysis, human and veterinary diagnostics, forensics, manufacturing, pharmaceutical processes, and quality control. The closed systems are comprised of pumps, valves, columns, tubing, detectors and the like.

The term "filtration" is used to refer to processes which separate materials on the basis of size rather than affinity.

The term "catalysis" is used to refer to processes in which one or more compounds form one or more reaction products in the presence of a further compound or material, the catalyst, which is not consumed in the process. An automotive catalytic converter is one example of a device in which one of more compounds form one or more reaction products in the presence of a catalyst immobilized on a solid support. A further example, without limitation, is an enzymatic reactor that catalyzes a reaction to form a reaction product.

Enzymatic reactors are used in biochemical reactions, for example, to react proteins, polysaccharides, to amplify nucleic acids and the like.

Electrokinetic (EK) pumps are devices which use electro-osmosis to create fluid pressure and flow in conduits. EK pumps comprise a charged porous medium normally contained in a conduit. A voltage is applied across the porous media to induce electro-osmosis.

As used herein, the term "monolith" refers to a non-particulate block material. The block of material is a coalescence of polymeric compositions into a skeletal core and pores. Those skilled in the art characterize porous materials on the basis of the skeletal core, pores and/or interstitial volume. The skeletal core refers to the solid structural part of the material. The interstitial volume refers to the empty, non-solid, space, comprised of pores. In particulate beds, the term interstitial will include space between particles and pore volume. Monolith materials do not have space between particles because the materials are non-particulate. The term as applied to monolith materials, as used herein, refers to the pore volume.

Porous monolith materials tend to be fragile. Porous monolith materials tend to shrink upon polymerization. The monolith materials tend to separate from walls of housings to form channels along the exterior of the materials, and fracture to form internal channels. These channels are different in character from the pores through which fluid would otherwise flow. The pores are normally of a consistent size and have a random pattern. The channels are larger and have a non-random mechanical stress determined pattern. The channels influence the flow of fluids through the materials.

Fluids which are pumped into the porous monoliths will flow through the path of least resistance. If channels or cracks are present, the fluid will preferentially pass through the channels and bypass the porous material. In separation chemistry, filtration and catalysis such flows lead to unpredictable or incomplete separations, filtrations or catalysis.

With respect to EK pumps, channels in the medium can result in poor pump performance and failure.

SUMMARY OF THE INVENTION

Embodiments of the present invention relate to porous materials for use in separations, filtrations, catalysis, EK pumps, and methods of making and using the same. Embodiments of the present invention form stable wall interfaces and are resistant to the development of internal channels.

One embodiment of the present invention directed to a composition of matter comprises a monolith having a skeletal core and pores. The skeletal core has a substantially homogeneous polymeric composition of two or more organic silane monomers. The pores form an interstitial volume in the monolith and have a pore size distribution in which there are at least macropores and less than 5% of the interstitial volume is mesopores. As used herein, the term "macropores" refers to flow through porosity, openings for fluids, which allow gross fluid movement through the monolith. Such macropores have a mean cross-sectional diameter of approximately 0.200 microns to about 4 microns and preferably, about 1 to 3 microns. The term "mesopores" is used to denote low permeability porosity, which normally is not associated with flow through the monolith. Such mesopores have a mean cross-sectional diameter of 0.005 to 0.05 microns.

A further embodiment features an interstitial volume in which mesopores comprise less than 2%. Other embodiments feature an interstitial volume in which mesopores comprise less than 1%.

A further embodiment of the present invention features a composition having a polymer distribution of substantially inter-connected large polymer molecules and small self-terminated polymer molecules. Reactive silane monomers tend to form chemical bonds with each other to create a long-branched polymer, which is capable of further reaction with reactive monomers; or a self-terminated polymer, which is not capable of further reaction with reactive monomers. The small polymers typically have 8 silicon atoms arranged as a cube structure. It is also possible that such self-terminating polymers can be formed with other numbers of silicon atoms, for example 10 or 12 or 16 or 20 or 24, with a closed ring or multiples of rings. The polymer distribution comprises less than 0.5% small polymers, potentially associated with closed ring structures. Other embodiments exhibit less than 0.1%, and other embodiments exhibit less than 0.05% small polymers.

A further embodiment of the present invention features a skeletal core in which a section of the core which deviates from the substantially homogeneous polymeric composition form one or more nodules. The nodules have a nodule cross-sectional diameter and the skeletal core, having a substantially homogeneous polymeric composition without a nodule, has a core cross-sectional diameter. The ratio of the nodule cross sectional diameter to core cross sectional diameter is not greater than 80 to 1. That is, the cross sectional diameter of nodules is limited to eighty times the cross sectional diameter of the homogeneous polymeric composition without a nodule. Other embodiments feature a ratio of 50 to 1. Still further embodiments feature a ratio of 10 to 1. Other embodiments of the present invention do not have any apparent nodules or such nodules do not have a cross sectional diameter greater than the cross sectional diameter of the homogeneous polymeric composition.

One composition of the present invention features two or more organic silane monomers selected from the group comprising at least a first monomer and at least a second monomer. The first monomer has a formula represented by Formula 1 below:

$$W_x B_y A_z Si;$$  Formula 1 wherein z plus y is at least 2 and z plus x plus y equal 4; W is $R^1$, or $R^2O$, or a halogen, or $-R^3Si(R^4O)_q T_k$, and q plus k equals 3, and T is $R^5O$, or $R^6$, or a halogen; B is $R^7O$ or a halogen; A is $R^8O$ or a halogen and $R^1$, $R^2$, $R^3$, $R^4$, $R^5$, $R^6$, $R^7$ and $R^8$ are independently selected from the group of hydrogen and aliphatic groups. The second monomer is also represented by Formula 1 wherein the selection of at least one of $R^{1-8}$, W, x, y or z is different than the selection of $R^{1-8}$, W, x, y or z for the first monomer.

A further composition features at least a third monomer represented by Formula 1, wherein the selection of at least one of $R^{1-8}$, W, x, y or z is different from the selection of $R^{1-8}$, W, x, y or z for the first monomer and different from the selection of $R^{1-8}$, W, x, y or z for the second monomer.

Preferred aliphatic groups are alkanes, alkenes and alkynes, branched and unbranched, aromatic and non-aromatic, and substituted and unsubstituted with one or more halogens, oxygens and nitrogens. A preferred aliphatic group is a lower alkyl group. As used herein, the term "lower alkyl" refers to organic functional groups having eighteen carbons or less. One embodiment of the present composition features lower alkyl groups comprising methyl, ethyl, propyl, butyl, pentyl, hexyl, heptyl and octyl.

Preferred halogens are chorine and bromine.

By way of example, without limitation, one first monomer is methyltrimethoxysilane, one second monomer is dimethyldimethoxysilane. A further embodiment features a third monomer selected from the group of silane monomers comprising tetramethoxysilane and bis(trimethoxysilyl)ethane. In embodiments which feature three monomers, the first monomer, second monomer and third monomer define proportions of the skeletal core. Preferred proportions are 10-15 parts first monomer, 1-10 parts second monomer and 0.5 to 5 parts third monomer.

One embodiment of the present invention has monolith having a skeletal core, having a skeletal volume, and pores defining an interstitial volume. The interstitial volume and skeletal volume form a monolith volume which monolith volume exhibits less than 1% shrinkage as the skeletal core is formed in a polymerization reaction.

One embodiment of the present invention features a monolith formed in a housing. The housing has at least one wall defining a chamber and an opening. Although the inventors do not wish to be bound to any theory, the limited shrinkage of the monolith allows the skeletal core to intimately abut and adhere to the at least one wall with substantially no voids.

The monolith is preferably made in situ in the chamber allowing for a wide range of shapes and sizes. Cylindrical and frusto-conical housings and/or chambers are preferred in some chromatography, filtration and catalysis applications. Other embodiments of the present invention feature micro- or nano-scale applications or chip-based applications. For example, without limitation, the chamber may have non-circular cross-sectional shapes, such as triangular, rectangular or trapezoidal shapes, an irregular shape, or length-wise may have straight, curved, U-shaped, coiled or serpentine shapes.

Embodiments of the present invention have a monolith with few deviations in the random arrangement of the pore volume. The skeletal core has a core mass and a skeletal volume and the pores define an interstitial volume. The core mass, skeletal volume and interstitial volume define a density and such density, when viewed in cross sections, varies by less than 5% throughout the monolith.

Embodiments of the present invention features a skeletal core in which a section of the core which deviates from the homogeneous polymeric composition form one or more nodules. The nodules have a nodule cross-sectional diameter and the skeletal core, having a substantially homogeneous polymeric composition without a nodule, has a core cross-sectional diameter. The ratio of the nodule cross sectional diameter to core cross sectional diameter is not greater than 80 to 1. Or, more preferably, the ratio is 50 to 1. Or, more preferably, the ratio is 10 to 1. Further embodiments of the present invention exhibit no apparent nodules.

Embodiments of the present invention feature the monolith as a chromatographic media, filtration media, EK pump media and catalytic support. The monolith may be used as formed for chromatography, filtration or EK pump media. The skeletal core of the monolith has an interior and an exterior surface. One embodiment of the present invention features an exterior surface which is functionalized to have a catalytic agent for performing catalysis. For example, without limitation, metals are added to the monomers during the formation of the monolith with at least part of the metal exposed to act as a catalytic agent.

Another embodiment of the present invention features an exterior surface having an exterior second polymeric layer with features different from the skeletal core. For example, without limitation, one embodiment features an exterior second polymeric layer having mesopores to facilitate chromatographic applications. A further embodiment of the present invention features an exterior surface comprising one or more modifying functional groups selected from the group of aliphatic functional groups, ion exchange functional groups, specific affinity functional groups and enzymes. For example, without limitation, one embodiment features the exterior surface of the skeletal core with methyl (C1) to octydecyl (C18) aliphatic groups. Another embodiment features an exterior surface having organic bases or organic acids which act as ion exchange groups. Another embodiment features an exterior surface having one or more ligand binding agents or chiral agents. Ligand binding agents are materials which form complexes, for example, an enzyme and its substrate, an antibody and its receptor, a nucleic acid and its complement. Chiral agents are molecules or functional groups that impart chiral specificity to a physical environment. Another embodiment features an exterior surface having one or more enzymatic agents.

A further embodiment of the present invention is directed to a device for performing a separation, filtration, or chemical reaction or pumping. The device comprises a housing having one or more walls defining a chamber and at least one opening. The chamber is for containing a monolith. The device further comprises a monolith having a skeletal core and pores. The skeletal core has a substantially homogeneous polymeric composition of two or more organic silane monomers. The pores define an interstitial volume and have a pore size distribution in which there are at least macropores and the interstitial volume has less than 5% mesopores. The macropores allow fluid movement through the skeletal core. The skeletal core is in the chamber abutting against one or more walls without voids. The skeletal core is for receiving fluids in the chamber and performing a separation, filtration or chemical reaction or for pumping.

Preferably, the device has an interstitial volume having fewer than 2% mesopores, or less than 1% mesopores.

One preferred polymeric composition has a polymer distribution of substantially linear large polymer molecules and small polymer molecules. The polymer distribution comprises less than 0.5% small polymers. As used herein, the term "small polymers" refers to polymers having twenty-four or less silicon atoms associated with short terminated polymers and ring structures of silicon oxide. In another embodiment, the small polymers are limited to polymers having twenty or less, or sixteen or less, or twelve or less, or eight or less silicon atoms. One ring structure is a cubic structure with eight silicon atoms.

One device features a polymer formed of said two or more organic silane monomers selected from the group comprising at least a first monomer and at least a second monomer. The first monomer has a formula represented by Formula 1 below:

   Formula 1 wherein z plus y is at least 2 and z plus x plus y equal 4; W is $R^1$, or $R^2O$, or a halogen, or —$R^3Si(R^4O)_qT_k$; and q plus k equals 3, and T is $R^5O$, or $R^6$, or a halogen; B is $R^7O$ or a halogen; A is $R^8O$ or a halogen and $R^1$, $R^2$, $R^3$, $R^4$, $R^5$, $R^6$, $R^7$ and $R^8$ are independently selected from the group of aliphatic groups. The second monomer is also represented by Formula 1 wherein the selection of at least one of $R^{1-8}$, W, x, y or z is different than the selection of $R^{1-8}$, W, x, y or z for the first monomer.

A further composition features at least a third monomer represented by Formula 1, wherein the selection of at least one of $R^{1-8}$, W, x, y or z is different from the selection of $R^{1-8}$, W, x, y or z for the first monomer and different from the selection of $R^{1-8}$, W, x, y or z for the second monomer.

Preferred aliphatic groups are lower alkyl groups. Preferred lower alkyl groups are methyl, ethyl, propyl, butyl, pentyl, hexyl, heptyl and octyl.

Preferred halogens are chlorine and bromine.

One embodiment of the present device features a first monomer, methyltrimethoxysilane and a second monomer, dimethyldimethoxysilane. A further embodiment features a third monomer selected from the group comprising tetramethoxysilane and bis(trimethoxysilyl)ethane. The first monomer, second monomer and third monomer define proportions of the skeletal core of 10-15 parts first monomer, 1-10 parts second monomer and 0.5 to 5 parts third monomer.

One embodiment of the present invention features a device wherein the skeletal core has a skeletal volume and the pores define an interstitial volume. Interstitial volume and skeletal volume form a monolith volume which monolith volume exhibits less than 1% shrinkage as said skeletal core is formed in a polymerization reaction. Preferably, the polymerization reaction is performed in situ, that is, in the chamber of the device.

The skeletal core has a core mass and a skeletal volume and the pores have an interstitial volume, which core mass, skeletal volume and interstitial volume define a density. Preferably, the density varies by less than 5% throughout the monolith as the monolith is viewed in cross sections.

Embodiments of the present invention feature a monolith in which a section of the core which deviates from the homogeneous polymeric composition forms one or more nodules. The nodules have a nodule cross-sectional diameter and the skeletal core having a substantially homogeneous polymeric composition without a nodule has a core cross-sectional diameter. The ratio of the nodule cross sectional diameter to core cross sectional diameter is not greater than 80 to 1, that is, the nodule cross sectional diameter is not more than eighty times greater than the core cross sectional diameter. Other embodiments feature a ratio of 50 to 1. Further embodiments feature a ratio of 10 to 1. Further embodiments of the present invention exhibit no apparent nodules or such nodules do not have cross sectional diameter greater than the cross sectional diameter of the homogeneous polymeric composition sections.

The chamber may take any shape or form. Embodiments of the present device are suitable for chip devices having chambers which are coiled, curved, serpentine, U-shaped, or have irregular shapes. Other embodiments of the present device feature a chamber having a cylindrical or frusto-conical shape.

The devices embodying features of the present invention are used in chromatography wherein the monolith in the chamber is a chromatographic media. The devices of the present invention are used in filtration wherein the monolith is a filtration media. The devices of the present invention are used as EK pumps in which the devices further comprise electrodes for applying an electrical potential across the monolith. The devices of the present invention are used in catalysis by providing the exterior surface of the skeletal core with a catalytic agent.

One embodiment of the present invention features a surface comprising a second polymer layer. The second polymer layer has mesopores for greater chromatographic efficiency or to aid catalysis. A further embodiment of the present invention features an exterior surface having one or more modifying functional groups selected from the group of aliphatic functional groups, ion exchange functional groups, chiral agents, enzymes, catalysts and specific affinity functional groups.

A further embodiment of the present invention is directed to a composition of matter comprising a monolith having a skeletal core and pores. The skeletal core has a substantially homogeneous polymeric composition, comprising a group of polymer molecules forming a mass and having a formula represented by Formula 2 below:

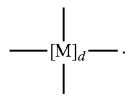

Formula 2

As used above, each M is a mix of three or more organic silane monomers comprising at least a first monomer, a second monomer and a third monomer. The first monomer has a formula represented by Formula 1 below:

$$W_x B_y A_z Si;$$  Formula 1 wherein z plus y is at least 2 and z plus x plus y equal 4; W is $R^1$, or $R^2O$, or a halogen, or $-R^3Si(R^4O)_q T_k$, and q plus k equals 3, and T is $R^5O$, or $R^6$, or a halogen; B is $R^7O$ or a halogen; A is $R^8O$ or a halogen and $R^1$, $R^2$, $R^3$, $R^4$, $R^5$, $R^6$, $R^7$ and $R^8$ are independently selected from the group of hydrogen and aliphatic groups. The second monomer is also represented by Formula 1 wherein the selection of at least one of $R^{1-8}$, W, x, y or z is different than the selection of $R^{1-8}$, W, x, y or z for the first monomer. The third monomer is represented by Formula 1, wherein the selection of at least one of $R^{1-8}$, W, x, y or z is different from the selection of $R^{1-8}$, W, x, y or z for the first monomer and different from the selection of $R^{1-8}$, W, x, y or z for the second monomer.

Each M is bonded to each further M through an oxygen associated with $R^{2,4,5,7\ or\ 8}O$ of M or each further M, or hydrolysis products of halogens, and $R^{2,4,5,7\ or\ 8}$ are leaving groups; or M is a terminal M or a partially terminal M and the open valences are $R^{1,3\ or\ 6}$, or $R^{2,4,5,7\ or\ 8}O$, or hydrogen or hydroxyl. As used above, d is the number of M within the bracket and branched through open valences and is a whole number integer in which 99% of the mass of polymer has a d greater than 24 with an upper limit determined by the molecular weight of the polymer.

Preferably, the aliphatic groups are lower alkyl groups, having one to eighteen carbons in linear or branched arrangements, substituted and unsubstituted with halogen, oxygen and/or nitrogen, aromatic and non-aromatic, saturated and unsaturated. Preferred lower alkyl groups comprise methyl, ethyl, propyl, butyl, pentyl, hexyl, heptyl and octyl. One embodiment of the present invention features a first monomer, methyltrimethoxysilane, and a second monomer, dimethyldimethoxysilane. An embodiment of the present invention features a third monomer selected from the group comprising tetramethoxysilane and bis(trimethoxysilyl)ethane.

Preferred halogens are chlorine and bromine.

The first monomer, second monomer and third monomer define proportions of the mix of the skeletal core which proportions are preferably 10-15 parts first monomer, 1-10 parts second monomer and 0.5 to 5 parts third monomer. As used herein, the term "mix" means the random association of monomers which comprise the polymer.

The monolith has a skeletal core having a skeletal volume and an interstitial volume defined by pores. The interstitial volume and skeletal volume form a monolith volume. The monolith volume exhibits, preferably, less than 1% shrinkage as the skeletal core is formed in a polymerization reaction. The skeletal core has a core mass and an interstitial volume which define a density. Preferably, such density varies by less than 5% throughout the monolith.

Embodiments of the present invention features the monolith in which a section of the core which deviates from the substantially homogeneous polymeric composition form one or more nodules. The nodules have a nodule cross-sectional diameter and the skeletal core having a substantially homogeneous polymeric composition without a nodule has a core cross-sectional diameter. The ratio of the nodule cross sectional diameter to core cross sectional diameter is not greater than 80 to 1. That is, the cross sectional diameter of the nodule is not more than eighty times that of the skeletal core section. Other embodiments feature a ratio of 50 to 1. Further embodiments feature a ratio of 10 to 1. Still further embodiments of the present invention exhibit no apparent nodules.

One embodiment of the present invention features a skeletal core having an interior and an exterior surface. One embodiment of the present invention features an exterior surface having a catalyst. Another embodiment features a surface having mesopores, by way of a second polymeric layer. The second polymer layer is placed around or over the exterior surface of the skeletal core. Another embodiment of the present invention features an exterior surface comprising one or more modifying functional groups selected from the group of aliphatic functional groups, ion exchange functional groups, chiral agents, enzymes, catalysts and specific affinity functional groups.

A further embodiment of the present invention is directed to a method of making a monolith having a skeletal core and pores, which pores define an interstitial volume. The skeletal core has a substantially homogeneous polymeric composition comprising a plurality of polymer molecules having a polymer mass and having a formula represented by Formula 2 below:

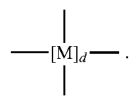

Formula 2

Each M of each bracket is a mix of three or more organic silane monomers comprising a first monomer, a second monomer and a third monomer. The first monomer has a formula represented by Formula 1 below:

$$W_x B_y A_z Si;$$  Formula 1

As used herein, the letters x, z, and y represent integers; z plus y is at least 2 and z plus x plus y equal 4; W is $R^1$, or $R^2O$, or a halogen, or $-R^3Si(R^4O)_q T_k$, and q plus k equals 3, and T is $R^5O$, or $R^6$, or a halogen; B is $R^7O$ or a halogen; A is $R^8O$ or a halogen and $R^1$, $R^2$, $R^3$, $R^4$, $R^5$, $R^6$, $R^7$ and $R^8$ are independently selected from the group of hydrogen and aliphatic groups. The second monomer is also represented by Formula 1 wherein the selection of at least one of $R^{1-8}$, W, x, y or z is different than the selection of $R^{1-8}$, W, x, y or z for the first monomer. The third monomer is represented by Formula 1, wherein the selection of at least one of $R^{1-8}$, W, x, y or z is different from the selection of $R^{1-8}$, W, x, y or z for the first monomer and different from the selection of $R^{1-8}$, W, x, y or z for the second monomer.

Each M is bonded to each further M through an oxygen associated with $R^{2,4,5,7 \text{ or } 8}O$ of M or each further M, or hydrolysis products of halogens, and $R^{2,4,5,7 \text{ or } 8}$ are leaving groups; or M is a terminal M or a partially terminal M and the open valences are $R^{1,3 \text{ or } 6}$, or $R^{2,4,5,7 \text{ or } 8}O$, or hydrogen or hydroxyl. As used above, d is the number of M within the bracket and branched through open valences and is a whole number integer in which 99% of the mass of polymer has a d greater than 24 with an upper limit determined by the molecular weight of the polymer.

The method comprises the steps of making a mixture of a first monomer, second monomer and third monomer and imposing reaction conditions on the mixture to form the substantially homogeneous polymer.

Preferred aliphatic groups are lower alkyl groups; and preferred lower alkyl groups are methyl, ethyl, propyl, butyl, pentyl, hexyl, heptyl and octyl.

Embodiments of the present invention feature, but are not limited to, a first monomer, methyltrimethoxysilane; a second monomer, dimethyldimethoxysilane and a third monomer selected from the group comprising tetramethoxysilane and bis(trimethoxysilyl)ethane.

The first monomer, second monomer and third monomer define proportions of the skeletal core. Preferred proportions are 10-15 parts first monomer, 1-10 parts second monomer and 0.5 to 5 parts third monomer.

The monolith has a skeletal volume and an interstitial volume, forming a monolith volume. Preferably, the monolith volume exhibits less than 1% shrinkage as the skeletal core is formed in a polymerization reaction. The skeletal core has a core mass and a skeletal volume. The interstitial volume, core mass and skeletal volume define a density, and such density varies by less than 5% throughout the monolith.

Embodiments of the present invention features a monolith in which a section of the core which deviates from the homogeneous polymeric composition form one or more nodules, the nodules have a nodule cross-sectional diameter and the skeletal core having a substantially homogeneous polymeric composition without a nodule has a core cross-sectional diameter. The ratio of the nodule cross sectional diameter to core cross sectional diameter is not greater than 80 to 1. That is the nodule cross sectional diameter is not more than eighty times the diameter of the homogeneous polymer core sections. Other embodiments feature a ratio of 50 to 1. Still further embodiments feature a ratio of 10 to 1. Some embodiments of the present invention exhibit no apparent nodules.

Preferably, the reaction mixture is placed or formed in situ. That is, in the event the monolith is to be used in a housing or containment vessel having a chamber, the reaction mixture is placed in the chamber. A preferred chamber has at least one wall defining such chamber and at least one opening. The polymer forms in the chamber integral and adjacent to the wall without voids. For example, the reaction mixture is placed in a capillary to form a skeletal core therein, or placed in a tube or cylinder to form a column, or placed in a channel of a chip to form a cartridge type device.

The skeletal core has an interior and an exterior surface. One embodiment of the present invention features a method further comprising the step of functionalizing the exterior surface. For example, without limitation, catalytic agents are added to the reaction mixture to provide a catalytic surface. Another embodiment of the present invention features a surface having a second polymeric layer. The method comprises the step of making a second polymeric layer as a deposit of or reaction with the skeletal core. The second polymer layer preferably has a formula represented by Formula 1 above and can be the same as or similar to any of the first monomer, second monomer or third monomer. The choice of monomers, reaction conditions and/or deposit conditions selected to form the second polymer layer determine the desired features. For example, without limitation, one preferred second polymer layer has mesopores. A further embodiment of the present invention features an exterior surface having one or more modifying functional groups selected from the group of aliphatic functional groups, ion exchange functional groups, specific affinity functional groups, enzymes, chiral agents and catalysts. The functional groups are placed on the exterior surface by choice of R groups, or reacting the exterior surface to form or add such functional groups.

A further embodiment of the present invention is directed to a method of making a device for performing separations, filtrations or catalysis or for use as an EK pump. The device has a housing and a monolith having a skeletal core and pores. The housing has at least one wall defining a chamber having at least one opening. The chamber contains the monolith, with the skeletal core integral with the at least one wall. The monolith contained in the chamber has pores which define an interstitial volume and a pore distribution. The skeletal core has a substantially homogeneous polymeric composition, represented by Formula 2 below:

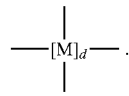

Formula 2

As used above, each M of each bracket is a mix of three or more organic silane monomers comprising a first monomer, a second monomer and a third monomer. The first monomer has a formula represented by Formula 1 below:

Formula 1

As used herein x, y and z represent integers wherein z plus y is at least 2 and z plus x plus y equal 4; W is $R^1$, or $R^2O$, or a halogen or $-R^3Si(R^4O)_qT_k$, and q plus k equals 3, and T is $R^5O$, or $R^6$; B is $R^7O$ or a halogen; A is $R^8O$ or a halogen and $R^1$, $R^2$, $R^3$, $R^4$, $R^5$, $R^6$, $R^7$ and $R^8$ are independently selected from the group of hydrogen and aliphatic groups. The second monomer is also represented by Formula 1 wherein the selection of at least one of $R^{1-8}$, W, x, y or z is different than the selection of $R^{1-8}$, W, x, y or z for the first monomer. The third monomer is represented by Formula 1, wherein the selection of at least one of $R^{1-8}$, W, x, y or z is different from the selection of $R^{1-8}$, W, x, y or z for the first monomer and different from the selection of $R^{1-8}$, W, x, y or z for the second monomer.

Each M is bonded to each further M through an oxygen associated with $R^{2,4,5,7 \text{ or } 8}O$ of M or each further M, or hydrolysis products of halogens, and $R^{2,4,5,7 \text{ or } 8}$ are leaving groups, or M is a terminal M or partially terminal M and the open valences are $R^{1,3, \text{ or } 6}$, or $R^{2,4,5,7 \text{ or } 8}O$ or hydrogen or hydroxyl. The letter "d" is the number of M within the bracket and branched through open valences and a whole number integer in which 99% of the mass of polymers, d is greater than 24, with an upper limit determined by the molecular weight of the polymer. The method comprises the steps of making a mixture of a first monomer, second monomer and third monomer in the chamber and imposing reaction conditions on the mixture to form the substantially homogeneous polymer.

Embodiments of this invention feature, but are not limited to aliphatic groups, lower alkyl groups, first monomers, second monomers, third monomers, proportions, shrinkage percentages, densities, nodules, and functionalized surfaces as described with respect to other embodiments.

The chamber may comprise straight linear forms or curved, coiled, serpentine or irregular shapes. The housing itself may assume many forms. One embodiment features a housing having a chamber in the shape of a cylinder, such as, for example, a cylindrical tube for a chromatography column, capillary for a capillary scale column or EK pump. One embodiment features a housing in the form of a chip having walls which define the chamber and the at least one opening. The opening may receive fluids directly or be placed in fluid communication with further apparatus. Some devices for use as an EK pump feature one or more electrodes to place an electrical potential on or across the skeletal core.

Embodiments of the method of making a device feature a skeletal core having an interior and an exterior surface. Embodiments for some applications feature an exterior surface that is modified by a further step. Again, as described previously, the exterior surface, in one embodiment, features a second polymer layer formed as a deposit of or reaction with the exterior surface. This second polymer can be different from or similar or identical to the polymer of the skeletal core. The second polymer layer preferably provides features which the exterior surface of the skeletal core does not have, for example, mesopores. In the alternative, the exterior surface is modified with functional groups selected from the group of aliphatic functional groups, ion exchange functional groups, and specific affinity functional groups.

A further embodiment of the present invention is directed to a method of performing separations, filtrations, catalysis or pumping fluids. The method comprises a step of providing a monolith having a skeletal core and pores. The skeletal core has a substantially homogeneous polymeric composition having a formula represented by Formula 2 below:

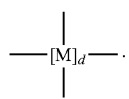

Formula 2

Each M of each bracket is a mix of three or more organic silane monomers comprising a first monomer, a second monomer and a third monomer. The first monomer has a formula represented by Formula 1 below:

$W_xB_yA_zSi;$    Formula 1

As used herein x, y and z represent integers wherein z plus y is at least 2 and z plus x plus y equal 4; W is $R^1$, or $R^2O$, or a halogen, or —$R^3Si(R^4O)_qT_k$, and q plus k equals 3, and T is $R^5O$, or $R^6$; B is $R^7O$ or a halogen; A is $R^8O$ or a halogen and $R^1$, $R^2$, $R^3$, $R^4$, $R^5$, $R^6$, $R^7$ and $R^8$ are independently selected from the group of hydrogen and aliphatic groups. The second monomer is also represented by Formula 1 wherein the selection of at least one of $R^{1-8}$, W, x, y or z is different than the selection of $R^{1-8}$, W, x, y or z for the first monomer. The monomer is represented by Formula 1, wherein the selection of at least one of $R^{1-8}$, W, x, y or z is different from the selection of $R^{1-8}$, W, x, y or z for the first monomer and different from the selection of $R^{1-8}$, W, x, y or z for the second monomer.

Each M is bonded to each further M through an oxygen associated with $R^{2,4,5,7 \ or \ 8}O$ of M or each further M, or hydrolysis products of halogens, and $R^{2,4,5,7 \ or \ 8}$ are leaving groups, or M is a terminal M or partially terminal M and the open valences are $R^{1,3, or \ 6}$, or $R^{2,4,5,7 \ or \ 8}O$ or hydrogen or hydroxyl. The letter "d" is the number of M within the bracket and branched through open valences and a whole number integer in which 99% of the mass of polymers, d is greater than 24, with an upper limit determined by the molecular weight of the polymer.

The method further comprises, for methods of separation, filtration or catalysis, the step of flowing a solution having compounds to be separated or particles to be filtered or reactants to be catalyzed through the pores of the monolith to form a separated compound, filtered solution or filtration product, or reaction product. For embodiments directed to EK pumps, the method features the step of imposing an electrical potential across the monolith to move fluids through the pores.

Embodiments of this invention feature, but are not limited to aliphatic groups, lower alkyl groups, first monomers, second monomers, third monomers, proportions, shrinkage percentages, densities, nodules, and functionalized surfaces as described with respect to other embodiments.

These and other features and advantages of the present invention will be apparent to those skilled in the art upon viewing the drawing which are described in brief below and the detailed discussion of the invention which follows.

DETAILED DESCRIPTION OF THE INVENTION

Embodiments of the present invention will now be described in detail as porous materials for use in separations, filtrations, catalysis and EK pumps, and methods of making and using the same with the understanding that the porous materials of the present invention have other uses and applications. Embodiments of the present invention described herein are presently believed to be the preferred compositions, devices and methods, in the sense of the best mode presently contemplated, and the invention should not be limited to the precise details and embodiments set forth.

Figure 1:
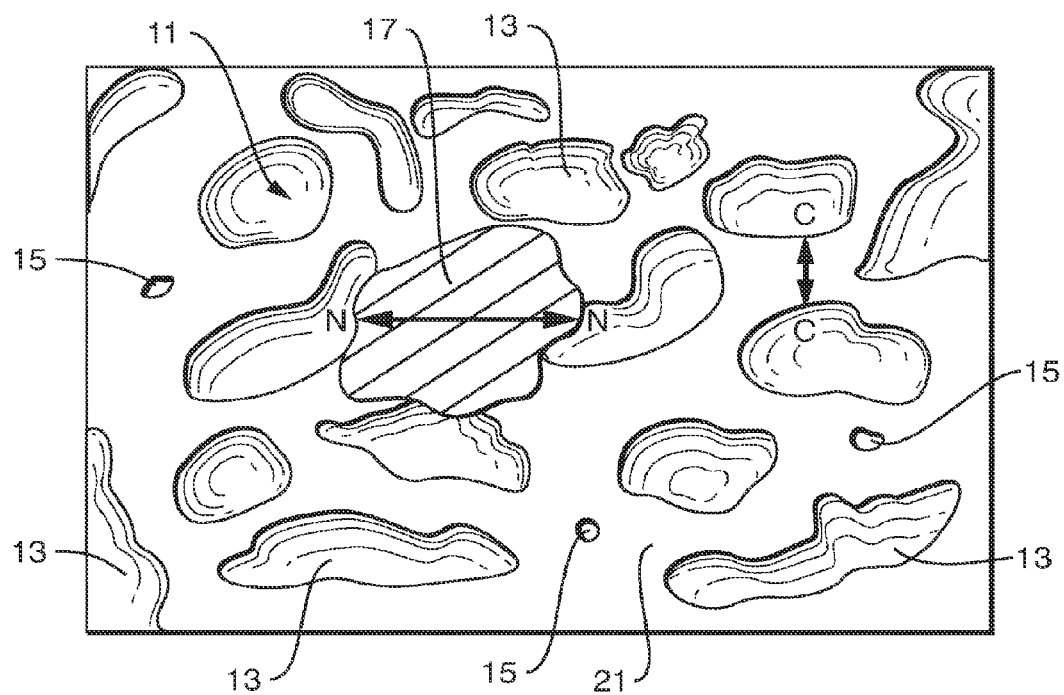
FIG. 1 depicts an artist's representation of a photomicrograph of a monolith having features in accordance with the present invention.

One embodiment of the present invention is directed to a composition of matter generally depicted in an artist's representation of a photomicrograph in FIG. 1. It should be noted, that FIG. 1 is intended to depict features for illustrative purposes and is not necessarily to scale. The composition of matter comprises a monolith, generally designated by the numeral 11. As depicted, the monolith is shown in a cross section of the block composition. The monolith 11 extends in all directions limited by the termination at wall structures and final terminus.

The monolith 11 has a skeletal core 21 and pores bearing designations of 13 and 15. The pores 13 and 15 form an interstitial volume in the monolith 11 and have a pore size distribution in which there are at least macropores, which are designated by the numeral 13, and potentially some mesopores, designated by the numeral 15. As depicted, less than 5% of the interstitial volume is mesopores. As used herein, the term "macropores" refers to flow through porosity, openings for fluids, which allow gross fluid movement through the monolith 11. Such macropores have a cross-sectional diameter of approximately 0.200 microns to about 4 microns and preferably, about 1 to 3 microns. The term "mesopores" is used to denote low permeability porosity, which normally is not associated with flow through the monolith 11. Such mesopores have a cross-sectional diameter of 0.005 to 0.05 microns. It will be recognized by those skilled in the art that the depiction of macropores and mesopores in FIG. 1 is not to scale but for illustrative purposes only.

The percentage of the interstitial volume comprising macropores and mesopores can be determined in several ways known in the art. Interstitial volume comprises the non-solids fraction allowing pycnometry to be used to determine solids density. With an accurate measured value for volume, the interstitial volume can be readily determined. Mesopore volume is determined by nitrogen sorption or mercury porosimetry with a proper adsorption-desorption model, for example, BET. A further embodiment features an interstitial volume in which mesopores comprise less than 2%. Other embodiments feature an interstitial volume in which mesopores comprise less than 1% or a total absence of mesopores.

The skeletal core 21 has a substantially homogeneous polymeric composition of two or more organic silane monomers. As used herein, the term "homogeneous" refers to the proportion of the two or more monomers throughout the skeletal core 21 and to the physical structure.

As used herein, the term "of two or more organic silane monomers" refers to the two or more monomers which during the polymerization process covalently bond to form the polymer and one or more leaving groups. It is understood that the leaving groups are no longer associated with the monomer or the polymer after the polymer is formed. The term is used herein in the manner that the term "styrene" is used to describe the polymer "polystyrene".

The pores 13 and 15 are substantially uniformly distributed throughout the monolith 11. In embodiments where the composition is formed in a housing having one or more walls, the surface tension at the interface of the wall and the solutions which will form the polymer may influence the distribution of pores 13 and 15. The area proximal to wall surfaces which are more readily wetted with the solutions will exhibit an increase of the skeletal core 21 and a lower pore volume. In the event the wall surface has poor wetting characteristics the area proximal to the wall may exhibit higher pore volume. It is preferable to have wall surfaces which are readily wetted and reactive.

Embodiments of the present composition form stable wall interfaces and are resistant to the development of internal channels and voids. Internal channels and voids are distinct from macropores 13 and mesopores 15. Internal channels and voids are recognized by those skilled in the art as empty space that is inconsistent with the overall distribution of the skeletal core 21 in space. The internal channels and voids do not follow the random paths of the pores and are of a larger cross sectional diameter. Internal channels and voids tend to follow areas of high stress within the polymer structure and are often seen over time as fluids flow through the interstitial volume under pressure.

The skeletal core 21 has a polymeric composition in which the individual polymer molecules have a range of molecular weights or sizes. The molecular weight or sizes can form a polymer distribution of substantially linear large polymer molecules and small polymer molecules. Embodiments of the present invention feature a polymer distribution comprises less than 0.5% small polymers, potentially associated with closed ring structures. Other embodiments of the invention exhibit less than 0.1% and still other embodiments exhibit less than 0.05% small polymers. As used herein, small polymers refer to polymers having twenty-four or less silicon atoms. Other embodiments feature small polymers having twenty or less, or sixteen or less, or twelve or less, or eight or less silicon atoms. Reactive silane monomers tend to form stable closed ring structures having eight silicon atoms.

Nodule 17 represents a section of the skeletal core 11 which is not homogeneous in chemical and/or physical characteristics. Without being bound to any particular theory, it is believed that nodule 17 is a concentration of one or more small polymers. Nodule 17 has a different optical index and is seen on photomicrographs as a round shaped mass normally not conforming to the size and shape of the rest of the skeletal core 11.

Figure 2:
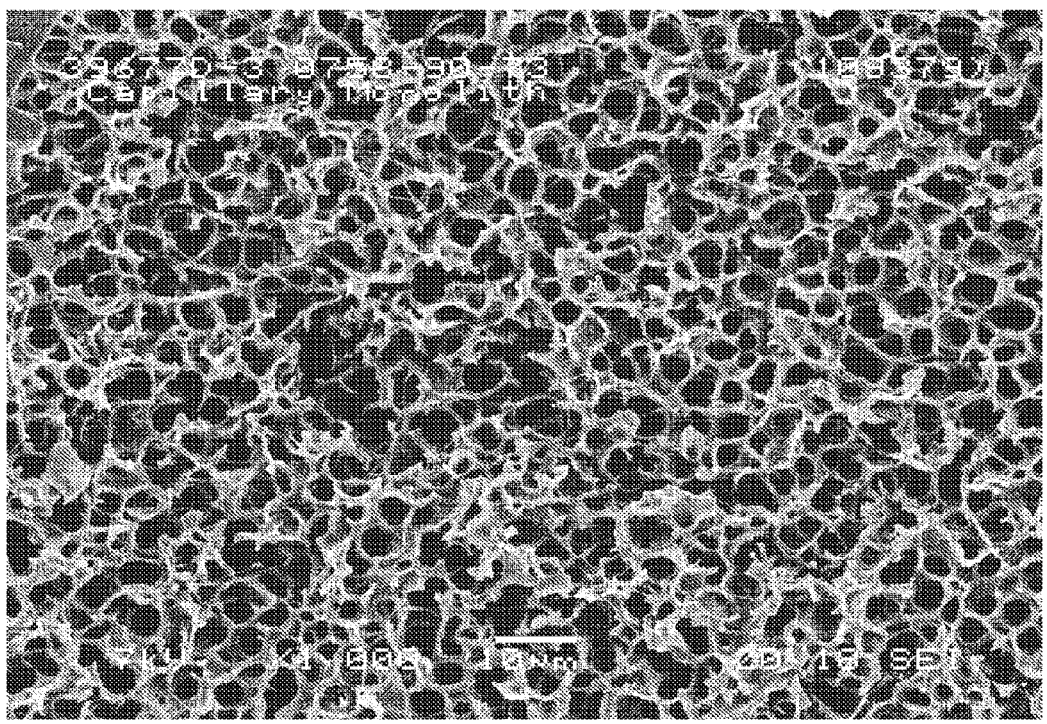
FIG. 2 depicts a photomicrograph of a monolith having features of the present invention

As used herein the term "substantially," as to the homogeneous polymeric composition, refers to a skeletal core having no nodules to one or more nodules. Each nodule, referring to nodule 17, has a nodule cross-sectional diameter. The cross sectional diameter can be estimated upon viewing a photomicrograph, such as the representation in FIG. 1, and measuring one or more diameters of which one is depicted, generally designated by line N-N in FIG. 1. Similarly, the each section of the skeletal core, having a homogeneous polymeric composition without a nodule, of which one section has been generally designated by the numeral 21, has a core cross-sectional diameter. One or more representative diameters, of which one is depicted, designated by the line C-C, is used to calculate an estimated core cross sectional diameter, The ratio of the nodule cross sectional diameter to skeletal core cross sectional diameter is not greater than 80 to 1. For example, the cross-sectional diameter of the nodule is no more than eighty times the cross sectional diameter of the typical homogeneous polymeric composition skeletal core section. And, in another embodiment the ratio is 50 to 1. And, in another embodiment, the ratio is 10 to 1, as depicted in FIG. 1. The photomicrograph of a homogeneous polymeric composition of FIG. 2 does not exhibit any nodules and is essentially nodule-free.

One composition of the present invention features two or more organic silane monomers selected from the group comprising at least a first monomer and at least a second monomer. The first monomer has a formula represented by Formula 1 below:

$$W_xB_yA_zSi;\qquad\qquad\text{Formula 1}$$

wherein z plus y is at least 2 and z plus x plus y equal 4; W is $R^1$, or $R^2O$, or a halogen, or $-R^3Si(R^4O)_qT_k$, and q plus k equals 3, and T is $R^5O$ or a halogen, or $R^6$; B is $R^7O$ or a halogen; A is $R^8O$ or a halogen and $R^1$, $R^2$, $R^3$, $R^4$, $R^5$, $R^6$, $R^7$ and $R^8$ are independently selected from the group of hydrogen and aliphatic groups. The second monomer is also represented by Formula 1 wherein the selection of at least one of $R^{1-8}$, W, x, y or z is different than the selection of $R^{1-8}$, W, x, y or z for the first monomer.

A further composition features at least a third monomer represented by Formula 1, wherein the selection of at least one of $R^{1-8}$, W, x, y or z is different from the selection of $R^{1-8}$, W, x, y or z for the first monomer and different from the selection of $R^{1-8}$, W, x, y or z for the second monomer.

As used herein, the term "aliphatic group" refers to organic compounds characterized by straight or branched chains. Aliphatic groups comprise alkyl groups, alkenyl groups and alkynyl groups. Chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl and the like. As used herein, the term "nitro" means —$NO_2$; the term "halogen" designates —F, —Cl, —Br or —I; the term "thiol" means SH; and the term "hydroxyl" means —OH. Thus, the term "alkylamino" as used herein means an alkyl group, as defined above, having an amino group attached thereto. Suitable alkylamino groups include groups having 1 to about 12 carbon atoms, preferably from 1 to about 6 carbon atoms. The term "alkylthio" refers to an alkyl group, as defined above, having a sulfhydryl group attached thereto. Suitable alkylthio groups include groups having 1 to about 12 carbon atoms, preferably from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "alicyclic group" includes closed ring structures of three or more carbon atoms. Alicyclic groups include cycloparaffins or naphthenes which are saturated cyclic hydrocarbons, cycloolefins, which are unsaturated with two or more double bonds, and cycloacetylenes which have a triple bond. They do not include aromatic groups. Examples of cycloparaffins include cyclopropane, cyclohexane and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics, such substituents can further comprise a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "alkyl" includes saturated aliphatic groups, including straight-chain alkyl groups, branched-chain alkyl groups, cycloalkyl (alicyclic) groups, alkyl substituted cycloalkyl groups and cycloalkyl substituted alkyl groups. In certain embodiments, a straight chain or branched chain alkyl has 10 or fewer carbon atoms in its backbone, e.g., $C_1$-$C_{10}$ for straight chain or $C_3$-$C_{10}$ for branched chain. In certain embodiments, a straight chain or branched chain alkyl has 8 or fewer carbon atoms in its backbone, e.g., $C_1$-$C_8$ for straight chain or $C_3$-$C_8$ for branched chain, and more preferably 6 or fewer. Likewise, particular cycloalkyls have from 4-10 carbon atoms in their ring structure and more preferably have 4-6 carbon atoms in the ring structure. The term "lower alkyl" refers to alkyl groups having from 1 to 6 (or 1 to 4) carbons in the chain and to cycloalkyls having from 3 to 6 carbons in the ring structure.

Moreover, the term "alkyl" (including "lower alkyl") as used throughout the specification and claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine and the like. Aryl groups also include polycyclic fused aromatic groups such as naphthyl, quinolyl, indolyl and the like. The aromatic ring can be substituted at one or more ring positions with such substituents, e.g., as described above for alkyl groups. Suitable aryl groups include unsubstituted and substituted phenyl groups.

The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "amino," as used herein, refers to an unsubstituted or substituted moiety of the formula —$NR_aR_b$, in which $R_a$ and $R_b$ are each independently hydrogen, alkyl, aryl, or heterocyclyl, or $R_a$ and $R_b$, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of $R_a$ and $R_b$, is further substituted with an amino group.

The term "alkyltrialkoxysilane" refers to a compound of the formula $R^9Si(OR^{10})(OR^{11})(OR^{12})$, in which each of the groups $R^9$-$R^{12}$ is independently selected and comprises a substituted or unsubstituted alkyl group, such as a $C_1$-$C_6$ alkyl group. In certain embodiments, each of $R^9$-$R^{12}$ is the same. In certain embodiments, each of $R^9$-$R^{12}$ is methyl. Examples of alkyltrialkoxysilanes include methyltrimethoxysilane, ethyltriethoxysilane, and the like.

The term "dialkyldialkoxysilane" refers to a compound of the formula $R^{13}R^{14}Si(OR^{15})(OR^{16})$, in which each of the groups $R^{13}$-$R^{16}$ is independently selected and comprises a substituted or unsubstituted alkyl group, such as a $C_1$-$C_6$ alkyl group. In certain embodiments, each of $R^{13}$-$R^{16}$ is the same. In certain embodiments, each of $R^{13}$-$R^{16}$ is methyl. Examples of dialkyldialkoxysilanes include dimethyldimethoxysilane, diethyldiethoxysilane, and the like.

The term "tetraalkoxysilane" refers to a compound of the formula $(OR^{17})(OR^{18})(OR^{19})(OR^{20})Si$, in which each of the groups $R^{17}$-$R^{20}$ is independently selected and comprises a substituted or unsubstituted alkyl group, such as a $C_1$-$C_6$ alkyl group. In certain embodiments, each of $R^{17}$-$R^{20}$ is the same. In certain embodiments, each of $R^{17}$-$R^{20}$ is methyl. Examples of tetraalkoxysilanes include tetramethoxysilane, tetraethoxysilane, and the like.

The term "bis(trialkoxysilyl)ethane" refers to a compound of the formula $[(Si(OR^{21})(OR^{22})(OR^{23})CH_2]_2$, in which each of the groups $R^{21}$-$R^{23}$ is independently selected and comprises a substituted or unsubstituted alkyl group, such as a $C_1$-$C_6$ alkyl group. In certain embodiments, each of $R^{21}$-$R^{23}$ is the same. In certain embodiments, each of $R^{21}$-$R^{23}$ is methyl. Examples of bis(trialkoxysilyl)ethanes include 1,2-bis(trimethoxysilyl)ethane and the like.

Preferred aliphatic groups are alkanes, alkenes and alkynes, branched and unbranched, aromatic and non-aromatic, and substituted and unsubstituted with halogens, oxygens and nitrogens. A preferred aliphatic group is a lower alkyl group. As used herein, the term "lower alkyl" refers to organic functional groups having six carbons or less. One embodiment of the present composition features lower alkyl groups comprising methyl, ethyl, propyl, butyl, pentyl, hexyl, and heptyl. An embodiment of the present invention that features higher alkyl, referring to organic functional groups greater than six carbons comprises octyl and octyldecyl.

By way of example, without limitation, one first monomer is methyltrimethoxysilane, one second monomer is dimethyldimethoxysilane. A further embodiment features a third monomer selected from the group of silane monomers comprising tetramethoxysilane and bis(trimethoxysilyl)ethane. In embodiments which feature three monomers, the first monomer, second monomer and third monomer define proportions of the skeletal core. Preferred proportions are 10-15 parts first monomer, 1-10 parts second monomer and 0.5 to 5 parts third monomer. As used herein, the proportions refer to dry weight parts.

Returning briefly to FIG. 1, the monolith 11 has a skeletal volume and an interstitial volume. The interstitial volume and skeletal volume form a monolith volume which monolith volume exhibits less than 1% shrinkage as the monolith 11 is formed in a polymerization reaction.

Figure 3:
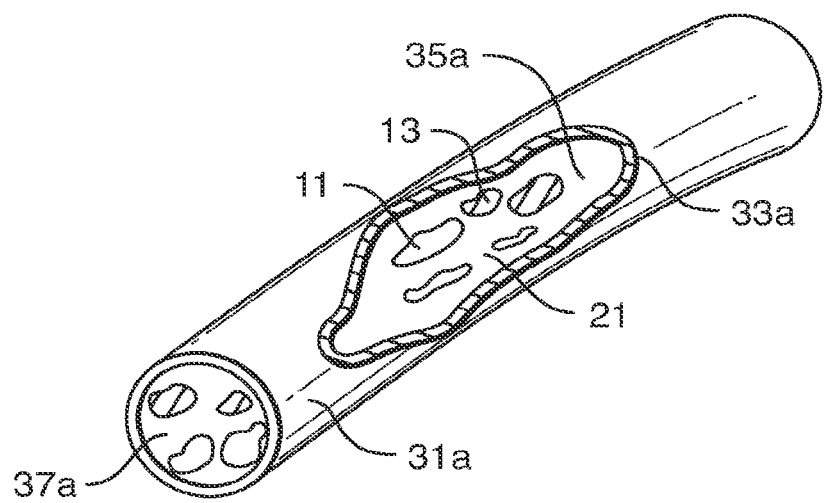
FIG. 3 depicts in partial cross section a device embodying features in accordance with the present invention.
Figure 4:
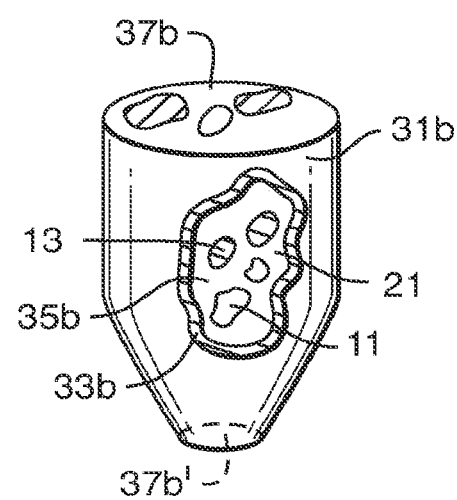
FIG. 4 depicts in partial cross section a device embodying features in accordance with the present invention; and, FIG. 5 depicts in partial cross section a device embodying features in accordance with the present invention.
Figure 5:
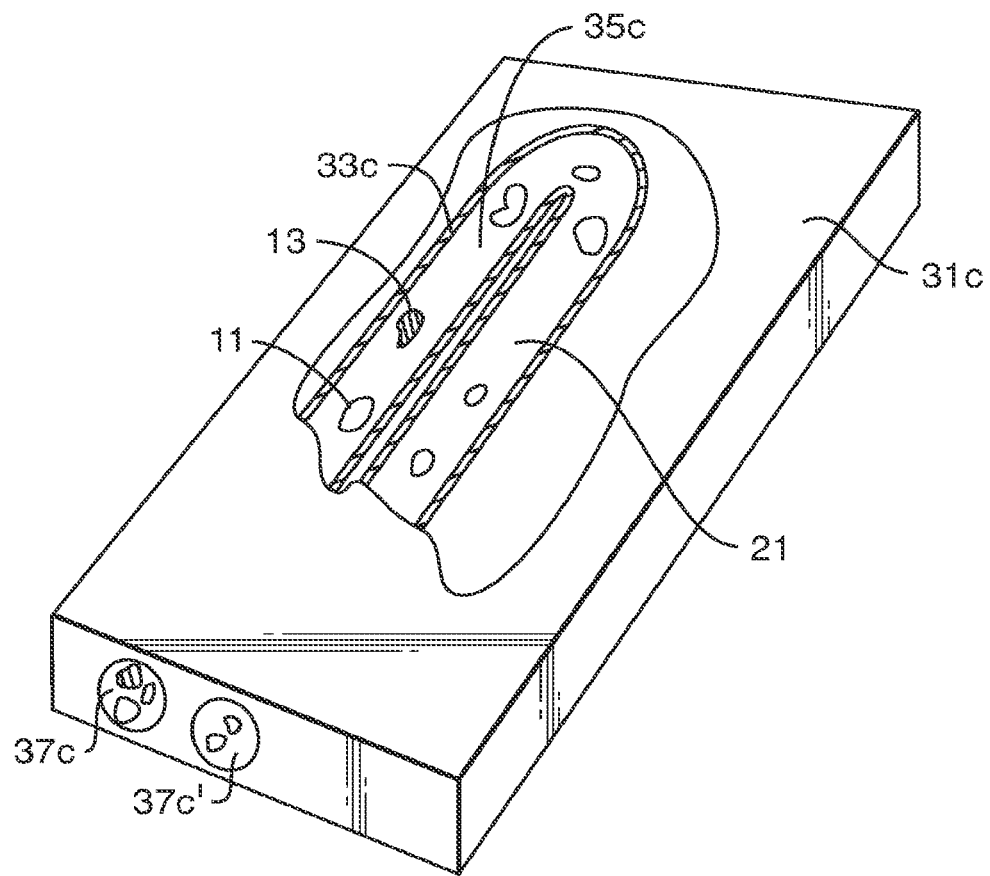

Turning now to FIGS. 3-5, one embodiment of the present invention features a monolith 11 formed in a housing, generally designated by numeral 31a in FIG. 3, numeral 31b in FIG. 4 and numeral 31c in FIG. 5. Each housing 31a, 31b and 31c has at least one wall 33a, 33b and 33c defining a chamber 35a, 35b and 35c and an opening. In FIG. 3, only one of two openings is depicted and designated by the numeral 37a. A second opening in the cylindrical housing 33a is obscured from view. In FIG. 4, two openings are depicted, designated by numerals 37b and 37b'. And, in FIG. 5, two openings are designated by the numerals 37c and 37c'.

Although the inventors do not wish to be bound to any theory, the limited shrinkage of monolith 11 allows the skeletal core 21 [not to scale] to intimately abut and adhere to the at least one wall 33a, 33b and 33c with substantially no voids. The limited number of nodules or absence of nodules, or small cross sectional diameter of nodules not greater than 80 times the cross sectional diameter of the skeletal core without nodules, or 50 times, or 10 times, reduces skeletal core stresses. The reduction in stress reduces the internal voids.

Turning to FIG. 3 in particular, the chamber 35a of the housing 33a is cylindrical. The housing 33a is made of a substantially rigid material such as rigid plastics, metals such as steel, particularly stainless steel or titanium, and fused silica. The dimensions of the housing 33a and chamber 35a are similar to columns and capillaries used in chromatography. Industrial applications may tend to favor larger housings 33a and research scale applications may favor smaller housings 33a. Cylindrical housings, such as housing 33a, and cylindrical chambers, such as chamber 35a, are used in high pressure applications such as high performance chromatography. Cylindrical housings, such as housing 33a, are available from numerous vendors as chromatography columns and capillaries.

Turning to FIG. 4 in particular, the chamber 35b of the housing 33b is a frusto-conical shape with an opening 37b at the top and a opening 37b' at the bottom. As depicted, the monolith 11 is to the top of the housing 33b and opening 37b. However, for some applications it is useful to provide chamber 35b with a section with an empty volume [not shown] to contain sample [not shown]. Cylindrical housings, such as housing 33a of FIG. 3, may also be provided with a section with an empty volume [not shown] to contain sample, for some applications. Similarly, housings 33a and 33b of FIGS. 3 and 4, respectively, may be equipped with integral tips and fittings [not shown] or receive tips and fittings for connection to other conduits, dispensing fluids or to be placed into fluids to withdraw fluid samples. Such tips and fittings are known in the art. Frusto-conical housings, such as housing 33b, and frusto-conical chambers, such as chamber 35b, are used in lower pressure applications for sample withdrawal or dispensing. Frusto-conical housings, such as housing 33b are of the type used in 96 well-devices common in the art and typically made of plastic.

FIG. 5 depicts a chip based housing 33c having a chamber 35c. As used herein, the term "chip" refers to a device which has planar features and/or a layered construction. Although not drawn to scale, housing 33c shows a micro and/or nano-scale device. Housing 33c is made from rigid plastic, ceramics, glasses, metals, such as steel, titanium, and aluminum, or fused silica. The chamber 35c may have any shape or length or cross-sectional form. For example, without limitation, the chamber 35c may have a circular, oval or partially rounded shape, or non-circular cross-sectional shapes, such as triangular, rectangular or trapezoidal shapes, or an irregular shape. Along its length, the chamber 35c may be straight, curved, coiled, serpentine or U-shape in form. The chamber 35c may comprise one plane or multiple planes.

The monolith 11 is made in situ in the chambers 35a, 35b and 35c. As will be discussed supra, the monolith 11 is formed from a liquid reaction mixture and the reaction mixture may assume or take any desired form or shape. The formation of the monolith 11 is associated with little, less than one percent shrinkage, or no shrinkage.

Monolith 11 in chamber 35a, 35b and 35c has few deviations in the random arrangement of the pore volume. The monolith 11 has skeletal core 21, having a core mass and a skeletal volume, and the pores which define an interstitial volume. The core mass, skeletal volume and interstitial volume define a density and such density, when viewed in representative cross sectional volumes, varies by less than 5% throughout the monolith 11.

Monolith 11 has utility as a chromatographic media, filtration media, EK pump media and catalytic support. As a filtration media, the pore size is adjusted by reaction conditions or the formation of layers to an appropriate size for selectivity. As a catalytic support, for promoting chemical reactions, the surface of the skeletal core 21 is functionalized with one or more catalytic agents. For example, without limitation, metals, as catalytic agents, are added to the reaction mixture of monomers during the formation of the monolith 11 to create an exterior surface of the skeletal core bearing metals which can act as catalysts. Or, the exterior surface of the skeletal core 21 is further reacted with chemical agents to covalently attach enzymes or synthetic catalysts.

As an EK pump media, a voltage is applied across the monolith 11 held in a chamber, such as 35a, 35b or 35c, to induce electro-osmosis in the manner known in the art.

As a chromatographic media, for some applications, it is useful to provide a skeletal core 21 with additional features. For example, without limitation, a skeletal core having mesopores is useful in some chromatographic applications. Mesopores are provided by placing a second polymeric layer on the exterior surface of the skeletal core 21. The second polymer layer is placed around or over the exterior surface of the skeletal core 21.

In the alternative or in addition, the exterior surface has one or more functional groups selected from the group of aliphatic functional groups, ion exchange functional groups, chiral functional groups and specific affinity functional groups. The functional groups are associated with the one or more silane monomers comprising the polymer as R groups or the skeletal core 21 is reacted with compounds which will leave the aliphatic groups, ion exchange functional groups, chiral functional groups and/or specific affinity groups associated or bonded to the monomer associated with the skeletal core 21. For example, without limitation, the skeletal core 21 has methyl (C1) to octydecyl (C18) aliphatic groups as result of the choice of R groups in the monomers. Or, the exterior surface has organic bases or organic acids which act as ion exchange groups. Or, the exterior surface has one or more ligand binding agents. Ligand binding agents are materials which form complexes, for example, an enzyme and its substrate, an antibody and its receptor, a nucleic acid and its complement. Functional groups, which are difficult to create through a selection of R groups on one or more monomers forming the polymer, are added to the exterior surface as chemical reactions involving residual hydrogen, hydroxyl groups or other reactive groups on the exterior surface.

A further embodiment of the present invention is directed to a composition of matter comprising a monolith 11, having a skeletal core 21 and pores, and a method of making such composition. The skeletal core 21 has a substantially homogeneous polymeric composition, comprising a group of polymer molecules forming a mass and having a formula represented by Formula 2 below:

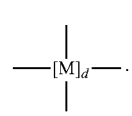

Formula 2

As used above, each M is a mix of two or more organic silane monomers comprising at least a first monomer, a second monomer and, preferably, a third monomer. The first monomer has a formula represented by Formula 1 below:

$W_x B_y A_z Si;$                                   Formula 1.

The letters W, B, and A represent elements or functional groups as defined previously. The second monomer is also represented by Formula 1 wherein the selection of at least one of $R^{1-8}$, W, x, y or z is different than the selection of $R^{1-8}$, W, x, y or z for the first monomer.

A further composition features at least a third monomer represented by Formula 1, wherein the selection of at least one of $R^{1-8}$, W, x, y or z is different from the selection of $R^{1-8}$, W, x, y or z for the first monomer and different from the selection of $R^{1-8}$, W, x, y or z for the second monomer.

Each M is bonded to each further M through an oxygen associated with $R^{2,4,5,7 \ or \ 8}$O of M or each further M, or hydrolysis products of halogens, and $R^{2,4,5,7 \ or \ 8}$ are leaving groups, or M is a terminal M or partially terminal M and the open valences are $R^{1,3, or \ 6}$, or $R^{2,4,5,7 \ or \ 8}$O or hydrogen or hydroxyl. The letter "d" is the number of M within the bracket and branched through open valences and a whole number integer in which 99% of the mass of polymers, d is greater than 24, with an upper limit determined by the molecular weight of the polymer.

The method comprises the steps of making a mixture of a first monomer, second monomer and, preferably, a third monomer and imposing reaction conditions on the mixture to form the substantially homogeneous polymer.

One embodiment of the present invention features but is not limited to, a first monomer, methyltrimethoxysilane; a second monomer, dimethyldimethoxysilane and a third monomer selected from the group comprising tetramethoxysilane and bis(trimethoxysilyl)ethane.

The first monomer, second monomer and third monomer define proportions of the skeletal core and the initial mixture. Preferred proportions are 10-15 parts first monomer, 1-10 parts second monomer and 0.5 to 5 parts third monomer.

The monolith 11 has a skeletal core 21, having a skeletal volume, and pores, defining an interstitial volume, which skeletal volume and interstitial volume form a monolith volume. Preferably, the monolith volume exhibits less than 1% shrinkage as the monolith 11 is formed in a polymerization reaction from the mixture. That is, the monolith volume is within 1% of the volume occupied by the initial mixture. The skeletal core 21 has a core mass and a skeletal volume. The interstitial volume, core mass, and skeletal volume define a density, and such density varies by less than 5% throughout the monolith 11.

Preferably, the reaction mixture is placed or formed in situ. That is, in the event the monolith 11 is to be used in a housing 33a, 33b 33c or any other containment vessel having a chamber 35a, 35b or 35c, the reaction mixture is placed in such chamber. A preferred chamber has at least one wall 31a, 31b or 31c defining such chamber and at least one opening such as 37a, 37b or 37b', or 37c or 37c'. The polymer forms without voids in the chamber 35a, 35b or 35c integral and adjacent to the wall 31a, 31b or 31c. For example, the reaction mixture is placed in a capillary, or placed in a tube or cylinder to form a column as depicted in FIG. 3. Or, the reaction mixture is placed in a frusto-conical form to form a sample preparation device as depicted in FIG. 4. Or, the reaction mixture is placed in a channel of a chip to form a cartridge type device as depicted in FIG. 5.

The skeletal core 21 has an interior and an exterior surface. One embodiment of the present invention features a method further comprising the step of functionalizing the exterior surface. For example, without limitation, catalytic agents are added to the reaction mixture to provide a catalytic surface. Another embodiment of the present invention features a surface having a second polymeric layer. The method comprises the step of making an second polymeric layer as a deposit of or reaction with the skeletal core. The second polymer layer preferably has a formula represented by Formula 1 above and can be the same as or similar to any of the first monomer, second monomer or third monomer. The choice of monomers, reaction conditions and/or deposit conditions selected to form the second polymer layer determine the desired features. For example, without limitation, one preferred second polymer layer has mesopores. A further embodiment of the present invention features an exterior surface having one or more modifying functional groups selected from the group of aliphatic functional groups, ion exchange functional groups, specific affinity functional groups. The functional groups are placed on the exterior surface by choice of R groups, or reacting the exterior surface to form or add such functional groups such as aromatic groups, ion exchange groups or specific affinity groups.

A further embodiment of the present invention is directed to a method of performing separations, filtrations, catalysis and/or pumping. The method comprises a step of providing a monolith 11 having a skeletal core 11 and pores. The skeletal core has a substantially homogeneous polymeric composition having a formula represented by Formula 2 below:

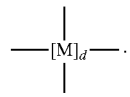

Formula 2

Each M of each bracket is a mix of three or more organic silane monomers comprising a first monomer, a second monomer and a third monomer. The first monomer has a formula represented by Formula 1 below:

$$W_x B_y A_z Si;$$ Formula 1 wherein z plus y is at least 2 and z plus x plus y equal 4; W is $R^1$, or $R^2O$, or a halogen, or $-R^3Si(R^4O)_q T_k$, and q plus k equals 3, and T is $R^5O$, or $R^6$, or a halogen; B is $R^7O$ or a halogen; A is $R^8O$ or a halogen and $R^1$, $R^2$, $R^3$, $R^4$, $R^5$, $R^6$, $R^7$ and $R^8$ are independently selected from the group of hydrogen and aliphatic groups. The second monomer is also represented by Formula 1 wherein the selection of at least one of $R^{1-8}$, W, x, y or z is different than the selection of $R^{1-8}$, W, x, y or z for the first monomer.

And, the third monomer is represented by Formula 1, wherein the selection of at least one of $R^{1-8}$, W, x, y or z is different from the selection of $R^{1-8}$, W, x, y or z for the first monomer and different from the selection of W, x or y for the second monomer.

Each M is bonded to each further M through an oxygen associated with $R^{2,4,5,7 \text{ or } 8}O$ of M or each further M, or hydrolysis products of halogens, and $R^{2,4,5,7 \text{ or } 8}$ are leaving groups, or M is a terminal M or partially terminal M and the open valences are $R^{1,3, \text{ or } 6}$, or $R^{2,4,5,7 \text{ or } 8}O$ or hydrogen or hydroxyl. The letter "d" is the number of M within the bracket and branched through open valences and a whole number integer in which 99% of the mass of polymers, d is greater than 24, with an upper limit determined by the molecular weight of the polymer.

The method further comprises the step of flowing a solution having compounds to be separated or particles to be filtered or reactants to be catalyzed through the pores of the monolith 11 to form a separated compound, filtered solution or product, or reaction product. With respect to pumping, the method comprises the step of placing an electrical potential across the monolith 11 and causing fluid to flow by electroosmosis.

Embodiments of this invention feature, but are not limited to aliphatic groups, lower alkyl groups, first monomers, second monomers, third monomers, proportions, shrinkage percentages, densities, functionalized surfaces and surface chemistries as described with respect to other embodiments.

EXEMPLIFICATION

The present invention may be further illustrated by the following non-limiting examples describing the preparation of porous monoliths and their use.

1.1. Materials

All reagents were used as received unless otherwise noted. Those skilled in the art will recognize that equivalents of the following supplies and suppliers exist and, as such, the suppliers listed below are not to be construed as limiting.

Example 1

Pretreatment of Capillary

The surface silanols provide linkers for monolith to adhere onto the capillary wall during polymerization process. This pretreatment process is designed to activate the capillary wall surface by increasing the surface silanol density. Untreated capillaries often showed satisfactory performance, but the treated capillaries yield more consistent results.

A polyimide coated fused silica capillary (Polymicro Technologies, Phoenix, Ariz., P/N TSP200350) is conditioned with base and acid. The capillary is rinsed by flowing acetone at approximately 50 μL/min for about 2 hours or more, followed by flowing 1M NaOH at approximately 50 μL/min for about 2 hours. The capillary is then sealed to retain the 1M NaOH. It is heated in an oven at approximately 80° C. for about 2 hours and cooled to room temperature. After removing the seals, the capillary is rinsed with 1M HCl at approximately 50 μL/min for about 2 hours. The capillary is finally rinsed with deionized water at approximately 50 μL/min for several hours, until all the acid is washed out. Although specific time and flow rates have been provided for each step of the capillary pretreatment, these values are not important so long as the rinsing volume is much greater than the inner volume of the capillary tube.

Example 2

Monolith Formation

In order to prevent any adverse temperature gradient during hydrolysis, all reagents were kept cold at the hydrolysis temperature (0~4° C.). A mixture of 5.50 mL methyltrimethoxysilane (MTMS), 2.85 mL dimethyldimethoxysilane (DMDMS) and 3.60 mL methanol (MeOH) is stirred vigorously at 0~4° C. After about 5 minutes stirring (or until the mixture becomes homogeneous), 2.60 mL of cold 1 M nitric acid ($HNO_3$) is added to the mixture to initiate the hydrolysis. After 2 minutes of stirred hydrolysis, 1.65 mL of cold 1,2-bis(trimethoxysilyl)ethane (BTME) is added into the hydrolysis mixture. After 3 minutes (total of 5 minutes stirred hydrolysis reaction), the mixture is filled into capillary tubes of 200 μm id and about 20 cm length (typically pretreated as outlined above) while the tubes are kept at low temperature. The mixture is typically pushed into capillary tubes by applying inert gas pressure, but other filling methods can be utilized as well. The ends of capillary tubes are sealed so that the mixture in the tubes is not exposed. The monolith was cured in a water bath at approximately 20° C. for 20~24 hours. The cured monoliths are then rinsed by passing water through the capillary/monolith at high pressures (typically 3000 psi) until the effluent is neutral in pH.

Example 3

Monolith Formation

In an alternative preparation, hybrid monoliths can be prepared using tetramethoxysilane (TMOS) instead of BTME. The conditions for monolith formation were generally similar to the conditions of Example 2, except as noted herein.

A mixture of 1.00 mL DMDMS and 2.80 mL methanol are vigorously stirred in an ice bath. Addition of 2.60 mL cold 1M nitric acid initiates the hydrolysis. After 2 minutes of stirring, 8.50 mL cold MTMS is added. After another 2 minutes, 0.50 mL cold TMOS is added, and stirred for 2 more minutes (total 6 minutes of hydrolysis). All hydrolysis process was kept at low temperature of 0~4° C. The hydrolysis solution is filled into capillary tubes and cured, in similar methods described above.

Example 4

Chromatographic Conditions

The performance of prepared monolithic columns is evaluated on a nanoAcquity UPLC® chromatographic system. A standard sample mixture, consisting of butyrophenone, valerophenon, hexanophenon, heptanophenone and uracil, was injected. An isocratic mobile phase of water/acetonitrile (40:60 v/v) separated the mixture into individual component peaks, which were subsequently detected by a UV detector at 240 nm wavelength. The monolithic column was kept at 30° C.

Calculating Column Performances

Theoretical calculations predict the monolithic HPLC columns to show high efficiency at a low back pressure compared to a particle-based columns. Preliminary experimental results confirmed the prediction.

The monolithic columns were characterized by comparing two test results: peak plate count, and permeability. From both results, equivalent particle sizes can be calculated assuming packed-particle columns. The peak plate count (N) is calculated by Empower™ 2 software. The plate count can be converted into the Height Equivalent to a Theoretical Plate (HETP, or H) using the following equation:

$$H = L/N$$

where L is the column length, and the equivalent particle size are calculated subsequently.

$$H = 2.5 \times d_p \quad d_p \text{ is the equivalent particle size.}$$

The permeability ($B_0$) is calculated from the column dimensions, fluidic conditions and the pressure drop across the column as follows:

$$B_0 = \frac{F \eta L}{\pi r^2 \Delta p} \text{ (unit: cm}^2\text{)}$$

where F is the flow rate, η is the viscosity, L is the column length, r is the radius of the column, and Δp is the pressure drop across the column. The particle size was estimated by the following equation:

$$d_p = \sqrt{1000 * B_0}$$

A representative chromatography column of Example 2 has an equivalent particle size of 1.5 μm from the chromatographic performance (plate count) and an equivalent particle size of 2.3 μm from the permeability measurement. Similarly, a representative column of Example 3 has an equivalent particle size of 2.6 μm from the chromatographic performance (plate count) and an equivalent particle size of 3.5 μm from the permeability measurement. These results clearly show the advantage of monolithic chromatographic columns where highly-efficient separation can be achieved without requiring high back-pressure typical of small particles.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents are considered to be within the scope of this invention and are covered by the following claims.

The invention claimed is:

1. A composition of matter comprising a monolith having a skeletal core and pores, said skeletal core having a substantially homogeneous polymeric composition of two or more organic silane monomers, said pores defining an interstitial volume in the skeletal core and have a pore size distribution in which there are at least macropores and less than 5% of the interstitial volume is mesopores, said macropores allowing fluid movement through the monolith:
  wherein said monolith is in a rigid housing having at least one wall that defines a chamber and an opening through which fluid can flow into the chamber; and
  wherein the monolith intimately abuts and adheres to the at least one wall with substantially no voids therebetween and fills a cross-sectional area of the chamber such that all fluid flowing into the chamber passes through the pores of the monolith.

2. The composition of matter of claim 1 in which said interstitial volume has fewer than 2% mesopores.

3. The composition of matter of claim 1 wherein said interstitial volume has fewer than 1% mesopores.

4. The composition of matter of claim 1 wherein said skeletal core has polymers which deviate from the substantially homogeneous polymeric composition to form nodules, said nodules have a nodule cross-sectional diameter and said skeletal core having a substantially homogeneous polymeric composition without a nodule has a core cross-sectional diameter wherein the ratio of the nodule cross sectional diameter to core cross sectional diameter is less than 80 to 1.

5. The composition of matter of claim 1 wherein said skeletal core has polymers which deviate from the substantially homogeneous polymeric composition to form nodules, said nodules have a nodule cross-sectional diameter and said skeletal core, having a substantially homogeneous polymeric composition without a nodule, has a core cross-sectional diameter wherein the ratio of the nodule cross sectional diameter to core cross sectional diameter is less than 50 to 1.

6. The composition of matter of claim 1 wherein said skeletal core has polymers which deviate from the substantially homogeneous polymeric composition to form nodules, said nodules have a nodule cross-sectional diameter and said skeletal core having a substantially homogeneous polymeric composition without a nodule has a core cross-sectional diameter wherein the ratio of the nodule cross sectional diameter to core cross sectional diameter is less than 10 to 1.

7. The composition of matter of claim 1 wherein said polymeric composition has a polymer distribution of substantially linear small polymer molecules and polymer molecules larger than the small polymer molecules and said polymer distribution comprises less than 0.5% small polymers.

8. The composition of matter of claim 7 wherein said small polymers have 24 silicon atoms or less.

9. The composition of matter of claim 1 wherein said two or more organic silane monomers are selected from the group comprising at least a first monomer and at least a second monomer, wherein said first monomer has a formula represented by Formula 1 below:

$$W_x B_y A_z Si;\qquad \text{Formula 1}$$

wherein z plus y is at least 2 and z plus x plus y equal 4; W is $R^1$, or $R^2O$, or a halogen, or-$R^3Si(R^4O)_q T_k$; and q plus k equals 3, and T is $R^5O$, or $R^6$, or a halogen; B is $R^7O$ or a halogen; A is $R^8O$ or a halogen and $R^1$, $R^2$, $R^3$, $R^4$, $R^5$, $R^6$, $R^7$ and $R^8$ are independently selected from the group of hydrogen and aliphatic groups, and wherein said second monomer is represented by Formula 1 wherein the selection of at least one of $R^{1-8}$, W, x, y or z is different than the selection of $R^{1-8}$, W, x, y or z for the first monomer.

10. The composition of matter of claim 9 wherein said two or more organic silane monomers comprise at least a third monomer represented by Formula 1, wherein the selection of at least one of $R^{1-8}$, W, x, y or z is different from the selection of $R^{1-8}$, W, x, y or z for said first monomer and different from the selection of $R^{1-8}$, W, x, y or z for said second monomer.

11. The composition of matter of claim 9 wherein said aliphatic groups are lower alkyl groups.

12. The composition of matter of claim 10 wherein said aliphatic groups are methyl, ethyl, propyl, butyl, pentyl, hexyl, heptyl and octyl.

13. The composition of matter of claim 9 wherein said first monomer is methyltrimethoxysilane.

14. The composition of matter of claim 9 wherein said second monomer is dimethyldimethoxysilane.

15. The composition of matter of claim 10 wherein said third monomer is tetramethoxysilane.

16. The composition of matter of claim 10 wherein said third monomer is bis(trimethoxysilyl)ethane.

17. The composition of matter of claim 10 wherein said first monomer, second monomer and third monomer define proportions of the skeletal core of 10-15 parts first monomer, 1-10 parts second monomer and 0.5 to 5 parts third monomer.

18. The composition of matter of claim 1 wherein said monolith has a skeletal volume and a pore volume, said pore volume and skeletal volume forming a monolith volume which monolith volume exhibits less than 1% shrinkage as said skeletal core is formed in a polymerization reaction.

19. The composition of matter of claim 1 wherein said housing has a cylindrical or frusto-conical shape.

20. The composition of matter of claim 1 wherein said monolith in said housing is a chromatographic media.

21. The composition of matter of claim 1 wherein said monolith in said housing is catalytic.

22. The composition of matter of claim 1 wherein said skeletal core has a core mass and a skeletal volume and said pores have a pore volume which core mass, skeletal volume and pore volume define a density and such density varies by less than 5% throughout said monolith.

23. The composition of matter of claim 1 wherein said skeletal core has an interior and an exterior surface.

24. The composition of matter of claim 23 wherein said exterior surface has a second polymer layer.

25. The composition of matter of claim 24 wherein said second polymeric layer has mesopores.

26. The composition of matter of claim 23 wherein said exterior surface has one or more modifying functional groups selected from the group of aliphatic functional groups, ion exchange functional groups, chiral functional groups, and specific affinity functional groups.

* * * * *